United States Patent
Giri et al.

(10) Patent No.: US 12,205,039 B1
(45) Date of Patent: Jan. 21, 2025

(54) GROUP MASKED AUTOENCODER FOR ANOMALY DETECTION

(71) Applicant: Amazon Technologies, Inc., Seattle, WA (US)

(72) Inventors: Ritwik Giri, Sunnyvale, CA (US); Srikanth Venkata Tenneti, Sunnyvale, CA (US); Karim Helwani, Mountain View, CA (US); Fangzhou Cheng, Mountain View, CA (US); Mehmet Umut Isik, Menlo Park, CA (US); Arvindh Krishnaswamy, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1113 days.

(21) Appl. No.: 17/087,181

(22) Filed: Nov. 2, 2020

Related U.S. Application Data (60) Provisional application No. 63/046,622, filed on Jun. 30, 2020.

(51) Int. Cl.
G06N 3/088 (2023.01)
G10L 25/03 (2013.01)
G10L 25/51 (2013.01)

(52) U.S. Cl.
CPC ............ *G06N 3/088* (2013.01); *G10L 25/03* (2013.01); *G10L 25/51* (2013.01)

(58) Field of Classification Search
CPC .......... G06N 3/088; G10L 25/03; G10L 25/51

USPC ........................................................ 706/20
See application file for complete search history.

(56) References Cited

U.S. PATENT DOCUMENTS 10,706,848 B1 * 7/2020 Greene ................ G10L 15/30
2020/0387834 A1 * 12/2020 Hackett ................ G06N 20/20

FOREIGN PATENT DOCUMENTS

WO WO-2020251059 A1 * 12/2020

OTHER PUBLICATIONS

Germain, Mickaël, et al. "MADE: Masked Autoencoder for Distribution Estimation." International Conference on Machine Learning, vol. 2, Jul. 2015, pp. 881-889. homepages.inf.ed.ac.uk/imurray2/pub/15made/made.pdf. (Year: 2015).*

* cited by examiner

*Primary Examiner* — Kieu D Vu
*Assistant Examiner* — Broderick C Anderson
(74) *Attorney, Agent, or Firm* — S. Scott Foster; Kowert, Hood, Munyon, Rankin & Goetzel, P.C.

(57) ABSTRACT

A group masked autoencoder may be implemented for anomaly detection. An autoencoder network model may be trained without supervision and applied to output an estimated joint probability distribution of normality for a group of frames of time series data. The estimated joint probability distribution may be used to determine an anomaly score for the time series data. An anomaly may be detected according to the anomaly score and a result that indicates a detected anomaly may be provided.

19 Claims, 8 Drawing Sheets

GROUP MASKED AUTOENCODER FOR ANOMALY DETECTION

RELATED APPLICATIONS

This application claims benefit of priority to U.S. Provisional Application Ser. No. 63/046,622, entitled "GROUP MASKED AUTOENCODER FOR ANOMALY DETECTION," filed Jun. 30, 2020, and which is incorporated herein by reference in its entirety.

BACKGROUND

Anomaly detection offers many benefits. Various operations, services, or systems that generate data may not be able to easily or quickly verify the correctness of these operations or services. Anomaly detection, however, can be used to examine the generated data to identify anomalous data, which could indicate problems or changes in an environment, for instance, that may need to be addressed.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for group masked autoencoder for anomaly detection are described herein. Some types of anomaly detection may operate on data sets with a large (e.g., nearly infinite) number of possible anomalous data that could deviate from normal (e.g., correct) data generated by a system. Devices, for instance, may produce sounds as a byproduct of various operations, which can indicate problems or changing conditions when, for instance, an anomalous sound is produced (e.g., indicating a likely malfunction, change in workload, and so on). Techniques, such as group masked autoencoder for anomaly detection, that can detect anomalous data without having to be trained can provide efficient and accurate anomaly detection techniques that can avoid problems associated with being unable to generate examples of many (or all) of the large numbers of anomalous data.

In various embodiments, group masked autoencoder may be used to estimate the density (e.g., the probability) that given input data is normal, given a normal (or unlabeled) set of training data. For example, group masked autoencoder may offer a way to determine the density of a progressive time series by taking into account the intra-frame statistics of the time series. As group masked autoencoder considers a group of frames, group masked autoencoder techniques can exploit the inter-spectral dependence of a time series. The density distribution may be calculated by means of the decomposition according to the probability chain rule, in various embodiments. In general, a set of conditional probabilities can be selected to estimate the joint distribution of N-samples of the multivariate time series.

In various embodiments, an autoencoder network can be used to determine the joint distribution where the outputs are the D conditional probabilities. If the conditional probabilities are predetermined, (e.g., based on physical knowledge) connections drawn between the respective nodes can be removed using a mask which removes connections from the fully connected autoencoder structure, (e.g., to enforce that each network output depends on an ordering of a group of frames). In some embodiments, frequency bins of dimensions of time series data may be assumed to be independent, so that cross connections between the bins can be removed and the output for each bin can be assumed to depend on previous frame in the same bin only.

In various embodiments, techniques for group masked autoencoder may include masking the weighted connections between layers of a standard autoencoder to convert it into a tractable density estimator. By implementing appropriate masks, the output of the autoencoder can be interpreted in an autoregressive manner for a given ordering of inputs (e.g., each input dimension is reconstructed solely from the dimensions preceding it in the ordering), in some embodiments. Multiple layers with nonlinearity can be added in this structure, which will result in a highly capable neural density estimator, in some embodiments.

In various embodiments, density of an input vector x may be calculated by a decomposition according to a probability chain rule. In an autoregressive setting this may be represented as $$p(x) = \prod_{d=1}^{D} p(x_d | x_{<d})$$

In various embodiments, the autoencoder output may have each dimension interpreted as one of the D conditional probability distributions as shown above, and each output unit $\hat{x}_d$ may only depend on the previous input units $x_{<d}$, and not the other units, $x_{\geq d}=[x_d, \ldots, x_D]^T$. In some embodiments, each conditional distribution may be parameterized as a mixture of C Gaussians (e.g., the autoencoder outputs mean, variance and the mixture component probabilities). For example, for D dimensional input, a number of outputs for the model may be D×C×3. This model may be trained by minimizing the negative log likelihood for all training data points, as may be represented by $$\text{Cost} = -\log p(x) = \sum_{d=1}^{D} -\log p(x_d | x_{<d})$$

In some embodiments, an example of a model for audio data may be where 5 Mel frames (e.g., frames of a mel-frequency cepstrum representation of sound) have been concatenated to produce 5×128=640 dimensional input vector, where 128 Mel bands have been used. In various embodiments, autoregressive ordering across frames (and not across each dimension of the input) may be implemented (e.g., group ordering as discussed below), the joint distribution can be decomposed as conditional over groups/frames, instead of individual dimensional conditionals. In some embodiments, the Mel bins (e.g., of different frequencies) in one frame may be conditionally independent when decomposed on all previous frames.

In various embodiments, an assumption may be that one input same can be represented as $t=[t_{i+1}, t_{i+2}, \ldots, t_{i+5}]^T \in \mathbb{R}^{640 \times 1}$ where the $i^{th}$ frame is $t_i \in \mathbb{R}^{128 \times 1}$. The joint density may be decomposed as $$p(t) = \prod_{i=1}^{5} p(t_i | t_{<i}) = \prod_{i=1}^{5} \prod_{j=1}^{128} p(t_{ij} | t_{<i})$$

In various embodiments, all the Mel bins in an output frame $t_i$ may depend on all the Mel bins from previous frames but not on other units (e.g., not on Mel bins of the $i^{th}$ frame, or on the Mel bins of future frames. One or a combination of various orderings of the input dimensions of frames, as discussed below with regard to FIGS. 4A-4C may be used, in various embodiments.

Figure 1:
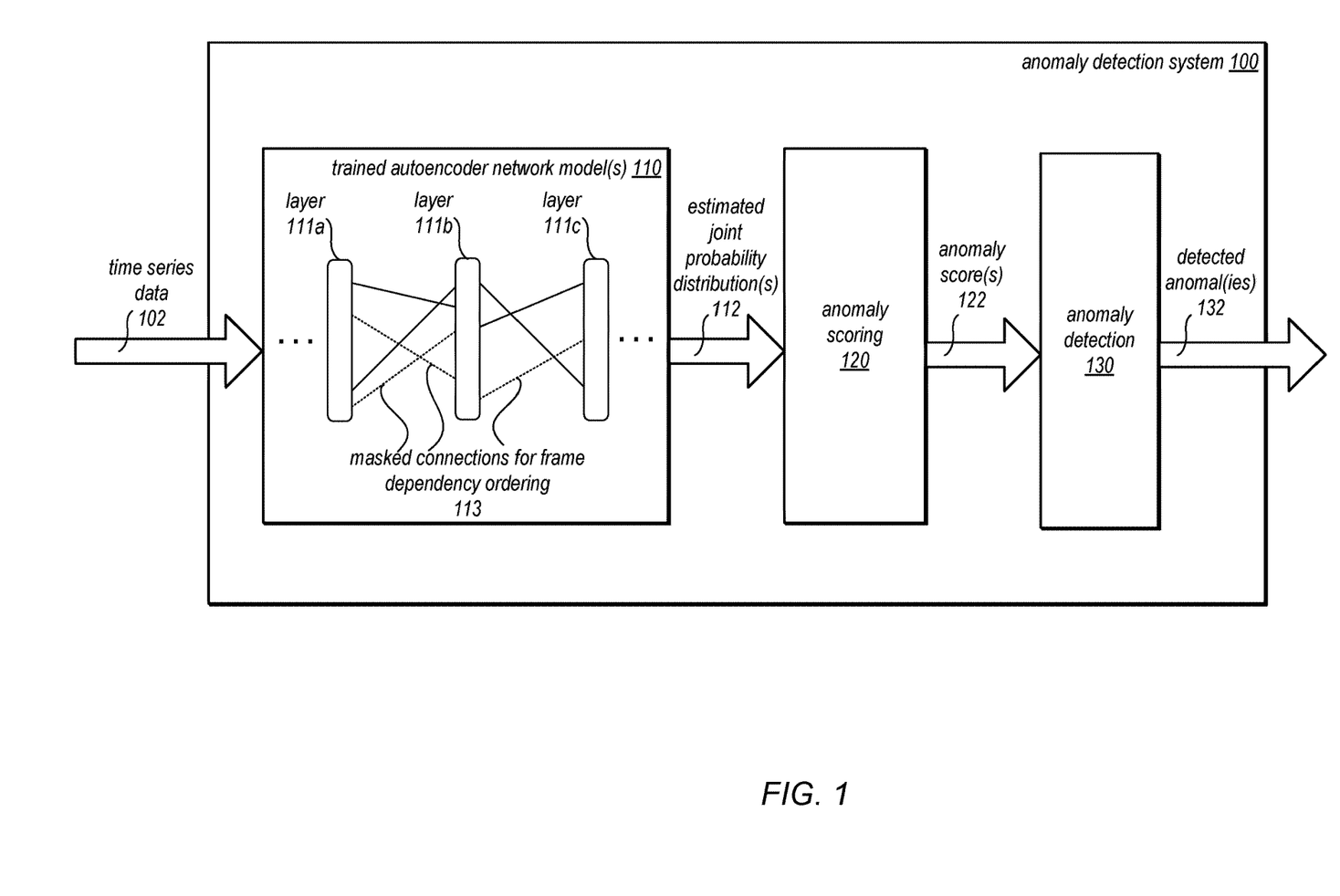
FIG. 1 illustrates a logical diagram of group masked autoencoder for anomaly detection, according to some embodiments.

FIG. 1 illustrates a logical diagram of group masked autoencoder for anomaly detection, according to some embodiments. Anomaly detection system 100 may implement the various techniques discussed above, as well as those below discussed with regard to FIGS. 3-7. Anomaly detection system 100 may be a stand-alone system or may implement as part of a network-based service of a provider network (e.g., monitoring service 210 in FIG. 2).

Anomaly detection system 100 may implement trained autoencoder network model(s) 110, which may be implement one (or multiple) layers, such as layers 111a, 111b, and 111c. These layers may be fully connected, in some embodiments, but masked according to remove connections according to a frame dependency ordering 113. Received time series data 102 may be input as a series of frames (e.g., Mel frames) into trained autoencoder network model(s) 110. The model may generate a join probability distribution for the frames, as indicated at 112. Anomaly scoring 120 may be implemented, in some embodiments, in order to determine anomaly score(s) 122 from the estimated joint probability distributions 112 (e.g., a negative log likelihood value). Anomaly detection 130 may detect anomalies 132 based on the scores 122, by comparing anomaly scores with a score threshold (which may or may not be user specified). Results indicating the detected anomal(ies) 132 may be provided by anomaly detection system 100.

Please note that the previous description of anomaly is a logical illustration and thus is not to be construed as limiting as to the implementation of an anomaly detection system.

This specification begins with a general description of a provider network that implements multiple different services, including a monitoring service, which may implement group masked autoencoder for anomaly detection. Then various examples of, including different components/modules, or arrangements of components/module that may be employed as part of implementing the services are discussed. A number of different methods and techniques to implement group masked autoencoder for anomaly detection are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
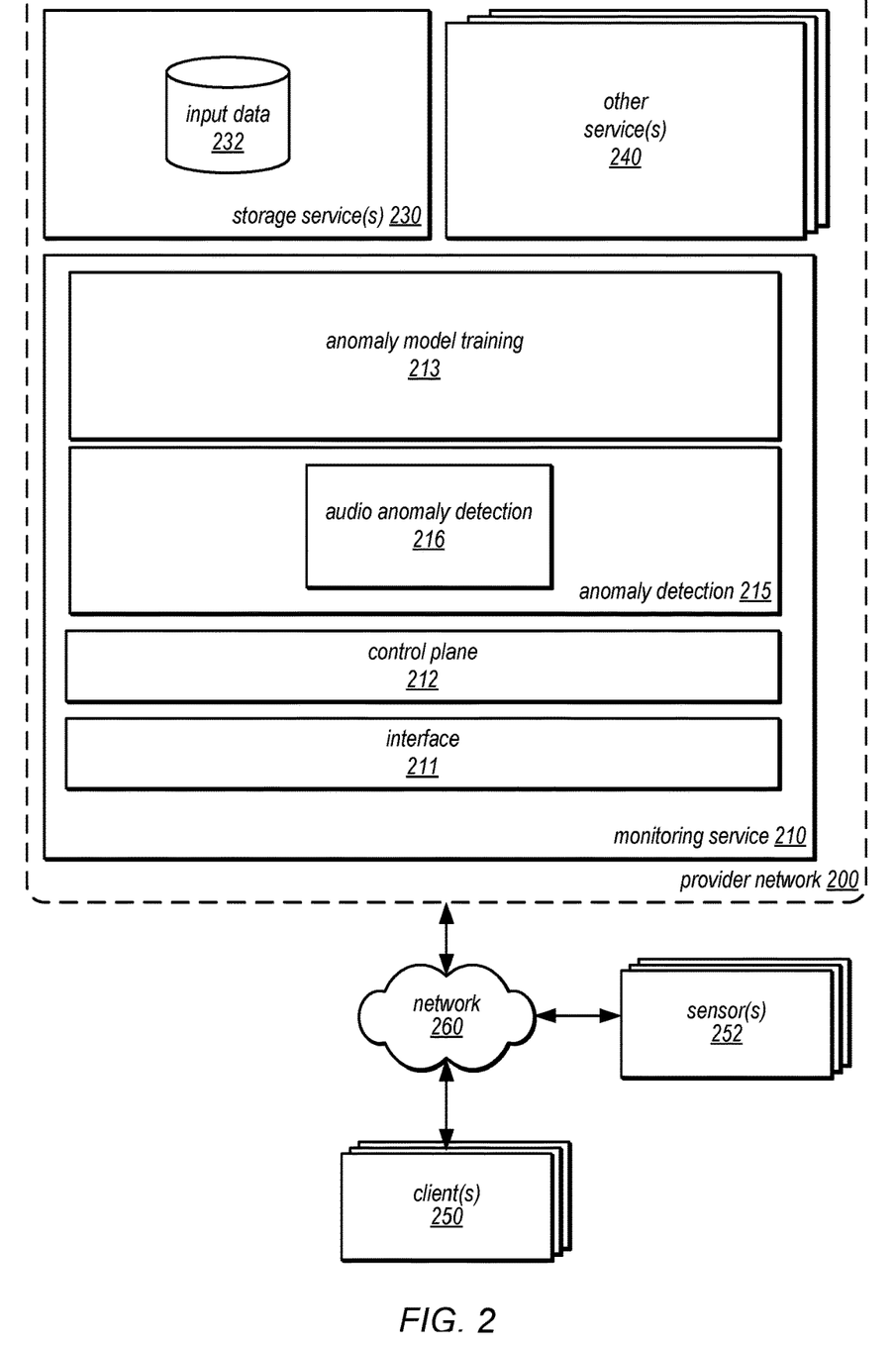
FIG. 2 illustrates an example provider network that may implement a monitoring service that implements group masked autoencoder for anomaly detection, according to some embodiments.

FIG. 2 illustrates an example provider network that may implement a monitoring service that implements group masked autoencoder for anomaly detection, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as monitoring service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of monitoring service 210 may be implemented by a particular node or may be distributed across several nodes. In some embodiments, a given node may implement the functionality of more than one service system component (e.g., more than one data store component).

Monitoring service 210 may implement interface 211 to allow clients (e.g., client(s) 250 or clients implemented internally within provider network 200, such as a client application hosted on another provider network service like an event driven code execution service or virtual compute service) to monitor discrete or continuous data streams (e.g., of time series data, such as audio data). For example, monitoring service 210 may implement interface 211 (e.g., a graphical user interface, programmatic interface that implements Application Program Interfaces (APIs) and/or a command line interface) may be implemented so that a client application can submit an audio stream or other data stream captures by sensor(s) 252 and/or from input data 232 stored in storage service(s) 230, or other storage locations or sources within provider network 200 or external to provider network 200 (e.g., on premise data storage in private networks). Interface 211 may allow a client to request the performance of anomaly detection using trained anomaly detection models, as discussed below with regard to FIGS. 3 and 5.

Monitoring service 210 may implement a control plane 212 to perform various control operations to implement the features of monitoring service 210. For example, control plane may monitor the health and performance of requests at different components anomaly detection 215 and anomaly model training 213 (e.g., the health or performance of various nodes implementing these features of monitoring service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available node to begin work on the request.

Figure 7:
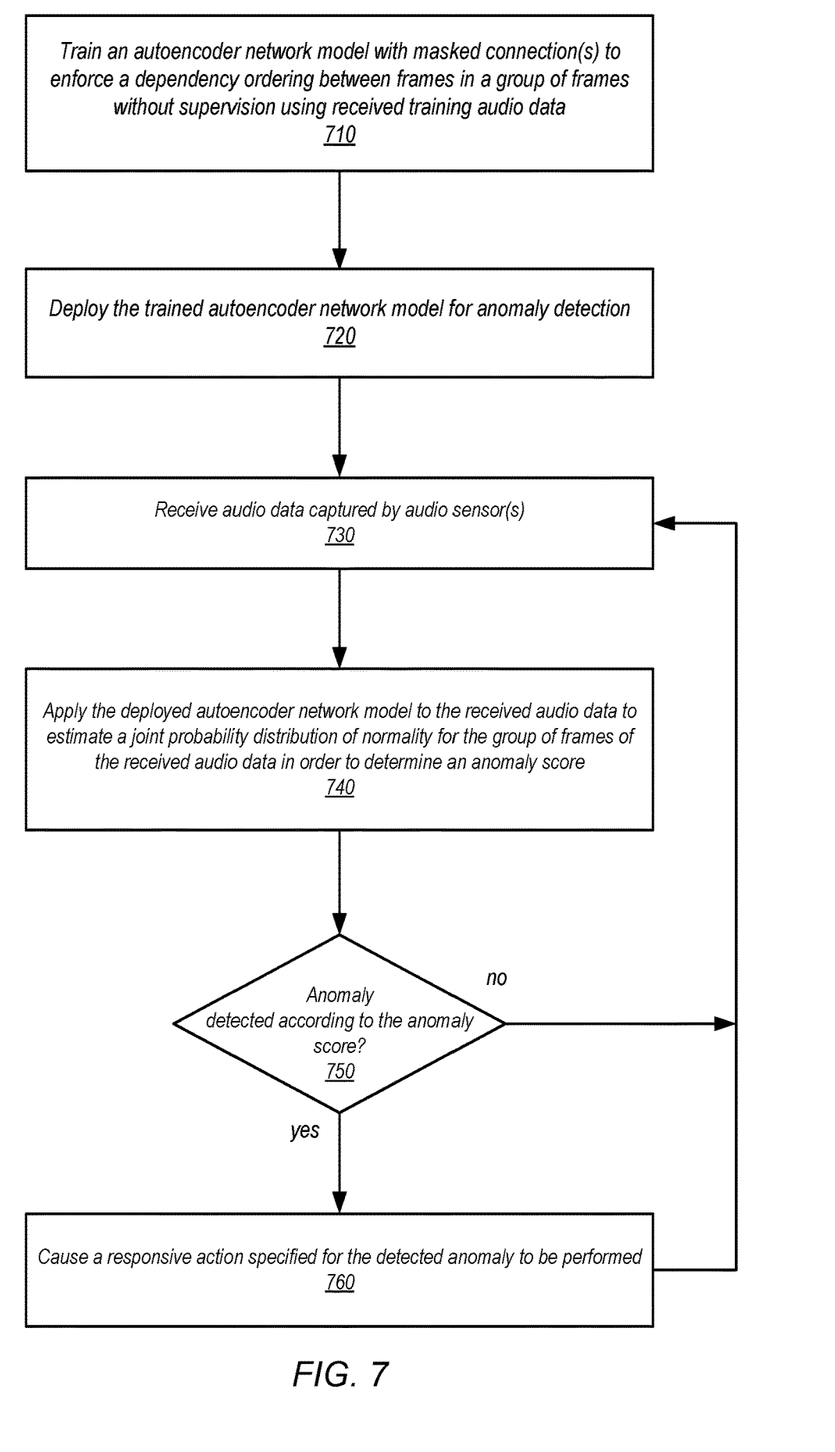
FIG. 7 illustrates a high-level flowchart of various methods and techniques to implement handling responsive actions for anomalies detected using group masked autoencoder for anomaly detection, according to some embodiments.

Monitoring service 210 may implement anomaly model training 213, as discussed in detail below with regard to FIGS. 3, 5, and 7. Anomaly model training 213 may train anomaly detection models, including anomaly detection models that use group masks for autoencoder networks. Monitoring service may implement anomaly detection 215, which may perform various types of anomaly detection on data, such as time series data. In some embodiments, anomaly detection 215 may implement audio anomaly detection 216 which may, for example monitor audio data collected from sensor(s) 252 for anomalies, as discussed in detail below with regard to FIGS. 3-7.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs), command line interfaces, and/or graphical user interfaces.

Generally speaking, clients 250 may encompass any type of client that can submit network-based requests to provider network 200 via network 260, including requests for monitoring service 210 (e.g., a request to train, deploy, or invoke an anomaly detection model, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of monitoring service 210 to implement various features. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like monitoring service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Sensor(s) 252 may, in various embodiments, collect, capture, and/or report various kinds of data, which may be evaluated for anomalies as time series data, including audio data (e.g., audio data capture by audio sensors placed near machines in a factory, plant, or other environment which can be monitored for failure or other problems via anomaly detection).

Figure 3:
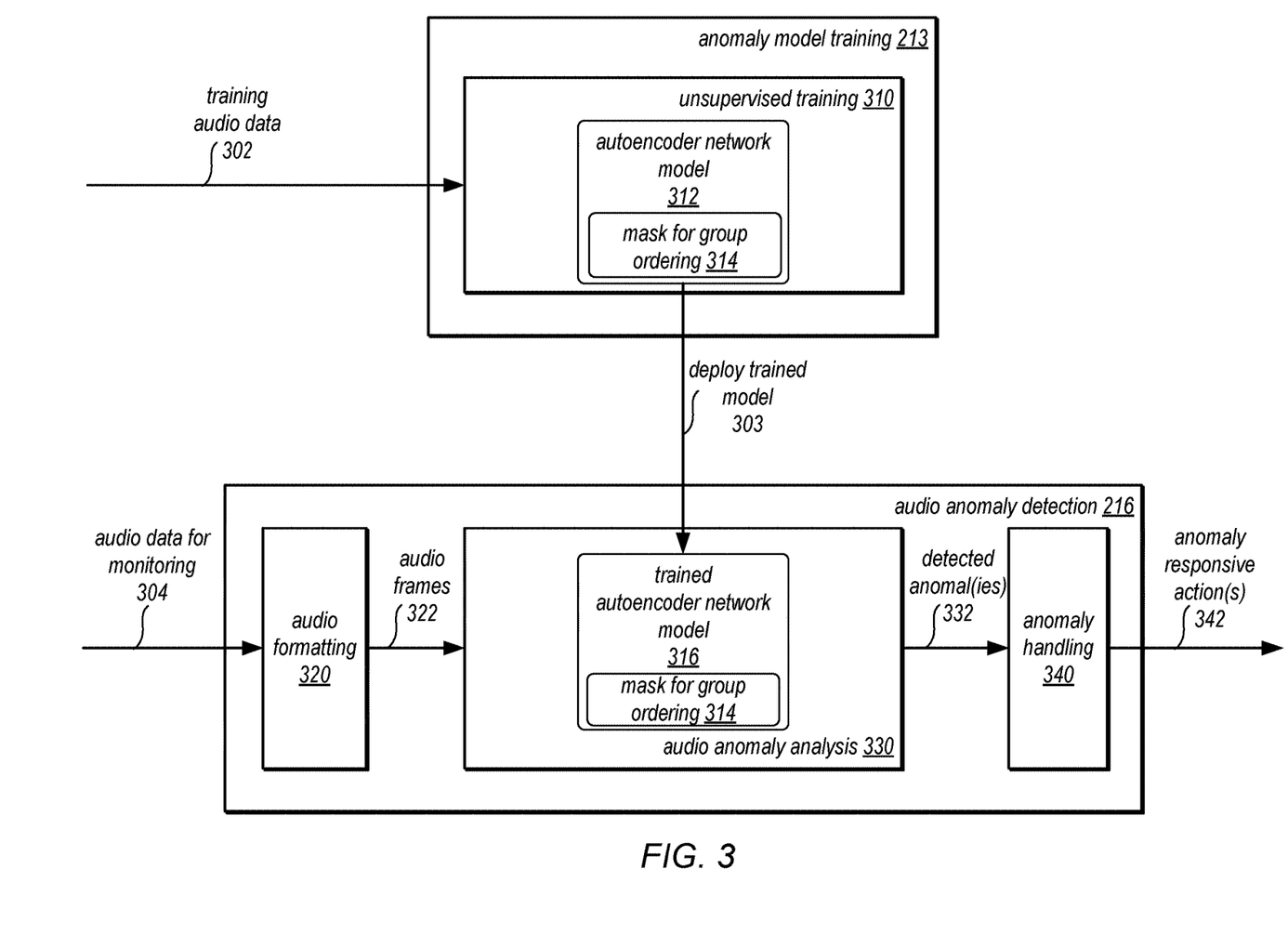
FIG. 3 illustrates a logical block diagram for audio anomaly detection using group masked autoencoder, according to some embodiments.

FIG. 3 illustrates a logical block diagram for audio anomaly detection using group masked autoencoder, according to some embodiments. Anomaly model training 213 may implement unsupervised training 310 in order to train autoencoder network model 312. As discussed above with regard to FIG. 1, a mask for group ordering 314 may be implemented to enforce a dependency ordering between individual frames in a group (e.g. according to the example orderings discussed below with regard to FIG. 1). Various unsupervised learning techniques, such as Adam optimization or stochastic gradient descent, among others, may be used to train the autoencoder network model 310 using training audio data 302. Training audio data 302 may be provided by a user via an interface (e.g., either by transferring audio data directly or identifying a storage location, like object storage service 230, that stores training audio data).

As indicated at 303, the trained model may be deployed as part of an anomaly detection pipeline on one or more resources of monitoring service 210. In some embodiments, the pipeline may include dedicated resources or be implemented specifically for a particular client application of monitoring service 210 (where other clients have other deployed models and resources).

When audio anomaly detection 216 receives audio data for monitoring 304 (e.g., as a stream or a discrete set of audio data requested for analysis), anomaly detection 215 may implement audio formatting 320 to parse, convert, format, or otherwise divide the audio data into audio frames, which may be provided as indicate at 322 to audio anomaly analysis 330. Audio anomaly analysis 330 may apply the trained autoencoder network model 316 to determine an anomaly score. Based on the anomaly score (e.g., as discussed below with regard to FIGS. 6 and 7), an anomaly may (or may not) be detected. Detected anomal(ies) may be provided, as indicated at 332, to anomaly handling 340, which may identify or determine responsive actions and perform then as indicated at 342 (e.g., by reporting detected anomalies, triggering various corrective workflows, further analyses, validation procedures, etc.).

Figure 4A:
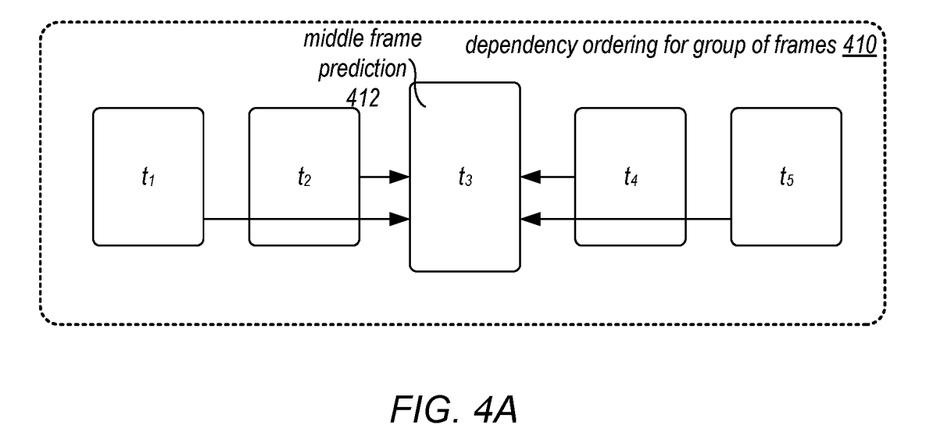
FIGS. 4A-4C illustrates example dependency orderings for a group of frames, according to some embodiments.

As noted above with regard to FIG. 1, an autoencoder network model may be masked using an ordering for a group of frames. FIGS. 4A-4C illustrates example dependency orderings for a group of frames, according to some embodiments. In FIG. 4A, an example dependency ordering for a group of frames 410 may include middle frame prediction 412 for frame $t_3$. For example, the middle frame prediction 412 may be condition on the four other frames which may be represented as $$p(t)=p(t_3|t_1,t_2,t_4,t_5)p(t_1,t_2,t_4,t_5)$$

Figure 4B:
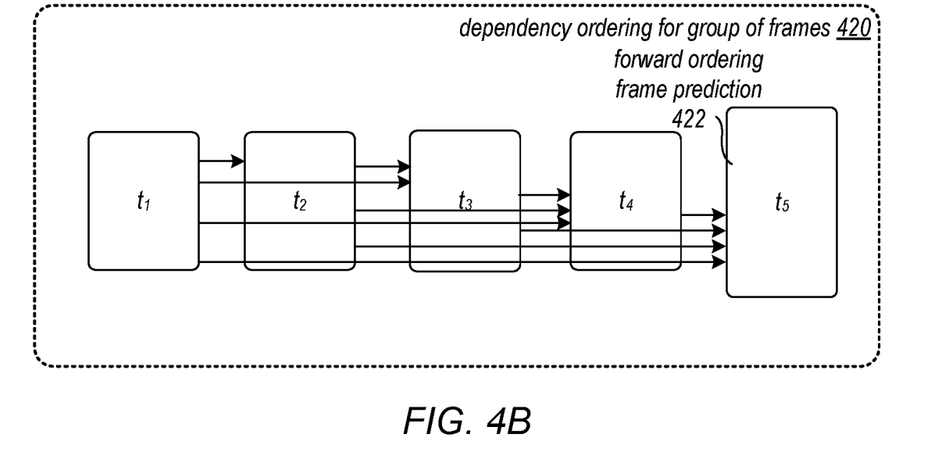

In FIG. 4B, example dependency ordering for a group of frames 420 may provide autoregressive (AR) forward ordering frame prediction 422, which may be represented as $$p(t) = \prod_{i=1}^{5} p(t_i|t_{<i})$$

Figure 4C:
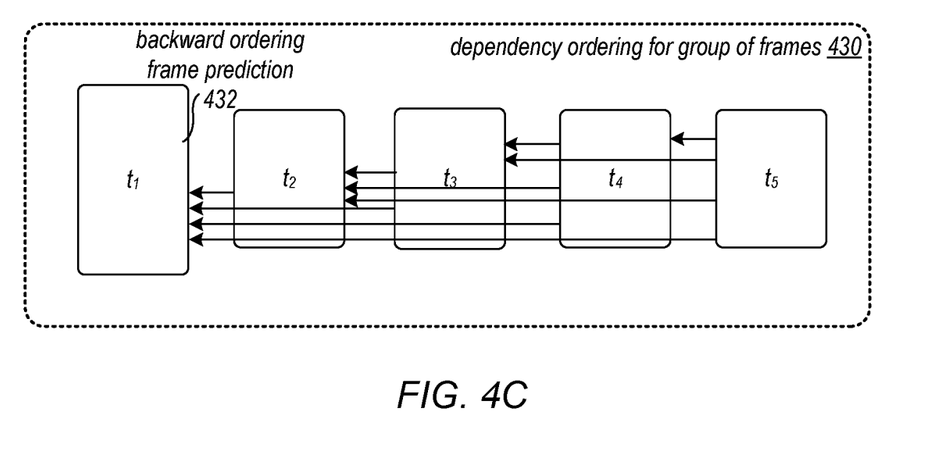

In FIG. 4C, example dependency ordering for a group of frames 430 may provide autoregressive (AR) backward ordering frame prediction 432, which may be represented as $$p(t) = \prod_{i=1}^{5} p(t_i|t_{>i})$$

Figure 5:
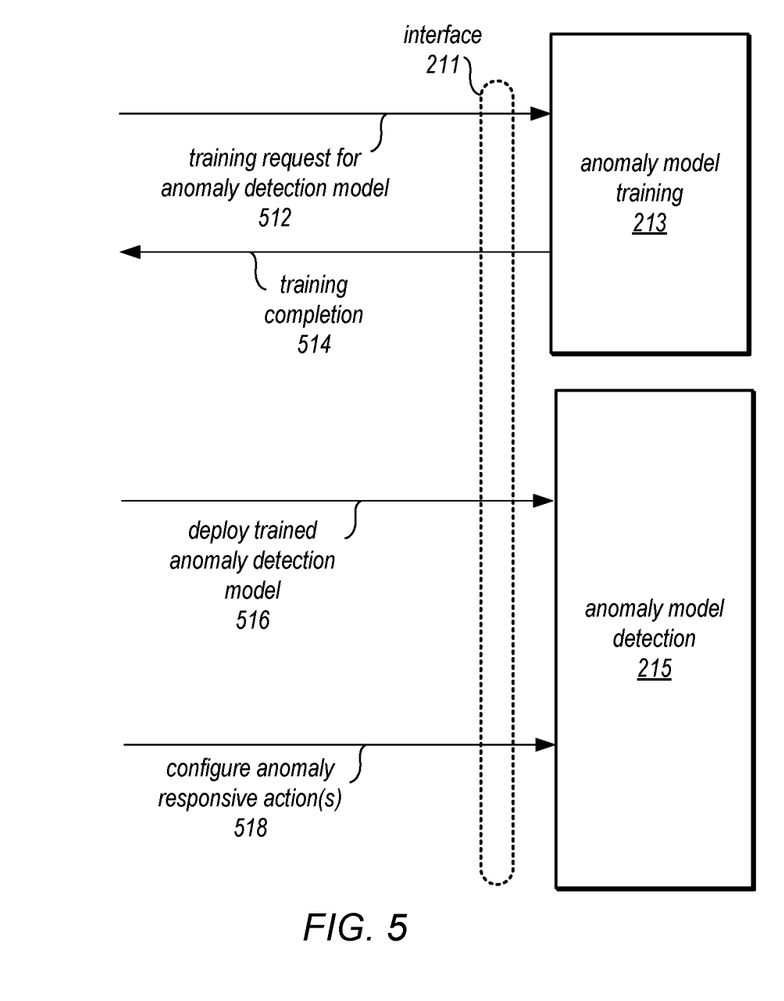
FIG. 5 illustrates an interface for a monitoring service to train and deploy anomaly detection models that implement group masked autoencoder for anomaly detection, according to some embodiments.

FIG. 5 illustrates an interface for a monitoring service to train and deploy anomaly detection models that implement group masked autoencoder for anomaly detection, according to some embodiments. Interface 211 may provide support for accepting, parsing, dispatching, and/or otherwise handling various requests to monitoring service 210. For example, in addition to the training data and other data for anomaly detection discussed above with regard to FIGS. 1 and 3 (e.g., audio data and other time series data), interface 211 may support requests to manage or configure the training of anomaly detection models. For example, training request 512 may be received via interface 211 and dispatched to anomaly modeling training 213. Training request 512 may identify a specific type of autoencoder network model, ordering for dependencies between frames (as discussed above with regard to FIGS. 4A-4C), training data (or a location of training data, such as a location or object in storage service(s) 230) and/or other training information (e.g., how long to train, features to optimize, training constraints, etc.). In some embodiments, anomaly model training 213 may provide status updates and/or a training completion indication 514.

Interface 211 may also support requests to configure the execution of a trained anomaly detection model, in various embodiments. For example, a request to deploy a trained anomaly detection model 516 may be received via interface 211 and dispatched to anomaly model detection 215. The identified model may be moved, copied, or made available at a set of one or more resources (e.g., service nodes) to perform anomaly detection on behalf of a client using that trained anomaly detection model (e.g., on audio data received at a submission network endpoint).

Interface 211 may also support requests to configure responsive action(s) for detected anomalies, as indicated at 518, in some embodiments. For example, a responsive action (or multiple actions) may be selected and stored in a mapping for anomalies, that provides which anomaly provokes which action(s), as well as how to perform the specified responsive actions. Responsive actions may include reporting detected anomalies, triggering various corrective workflows, further analyses, validation procedures, among others.

Although FIGS. 2-5 have been described and illustrated in the context of a provider network implementing a monitoring service, the various components illustrated and described in FIGS. 2-5 may be easily applied to other systems that implement anomaly detection. As such, FIGS. 2-5 are not intended to be limiting as to other embodiments of anomaly detection.

Figure 6:
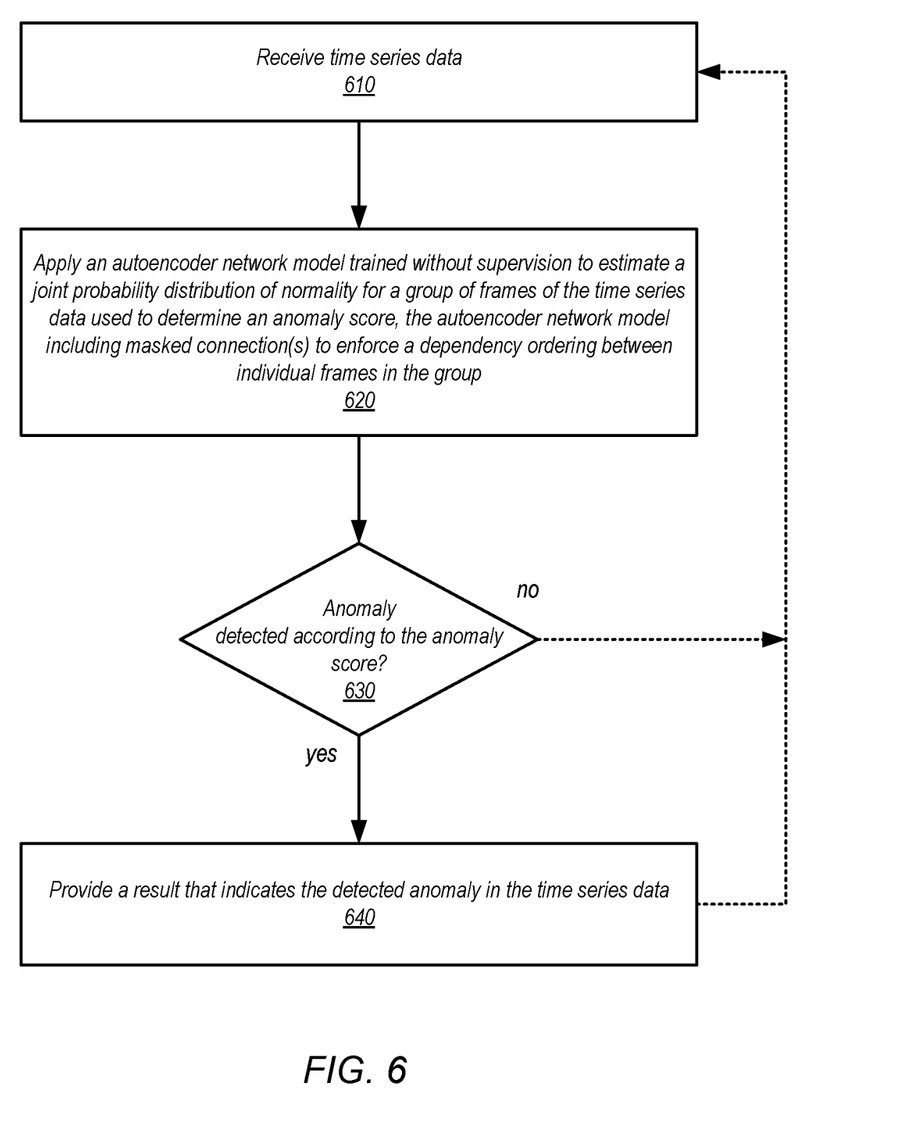
FIG. 6 illustrates a high-level flowchart of various methods and techniques to implement group masked autoencoder for anomaly detection, according to some embodiments.

FIG. 6 illustrates a high-level flowchart of various methods and techniques to implement group masked autoencoder for anomaly detection, according to some embodiments. Various different systems and devices may implement the various methods and techniques described below, either singly or working together. Therefore, the above examples and or any other systems or devices referenced as performing the illustrated methods, are not intended to be limiting as to other different components, modules, systems, or devices.

As indicated at 610, time series data may be received, in various embodiments. The time series data may be data, such as audio data, video data, infrared, or other data points collected over time for which unsupervised anomaly detection may be performed, in some embodiments. In various embodiments, the time series data may be pre-formatted and ready for anomaly detection (e.g., already in an appropriate file format and frames). In some embodiments, various pre-processing operations to reformat, convert, otherwise produce time series data in a format for anomaly analysis (e.g., converting the audio data into frames that are spectrograms).

As indicated at 620, an autoencoder network model trained without supervision may be applied to the time series data in order to estimate a joint probability distribution of normality for a group of frames of the time series data, in various embodiments. The joint probability distribution may be used to determine an anomaly score for the time series data, in some embodiments. For example, a negative log likelihood may be determined using the joint probability distribution. As discussed above with regard to FIG. 1, the autoencoder network model may have masked connections (even though the model may be initially a fully-connected model) in order to enforce a dependency ordering between individual frames in the group. For example, one of the various example dependency orderings discussed above with regard to FIGS. 4A-4C may be implemented.

In some embodiments, multiple applications of the autoencoder network model trained with differently masked connections for different orderings may be performed and combined (e.g., using weights to emphasize some dependency orderings more than others, or equally among the orderings). In some embodiments, the dependency ordering(s) may be specified by a user via an interface. In some embodiments, the dependency ordering(s) may be automatically selected by trialing different ones of the dependency orderings and comparing results with a validation set of time series data (e.g., where anomalies are identified) to select the dependency ordering(s) with the best performance to use in future anomaly detection analyses.

As indicated at 630, an anomaly may be detected according to the anomaly score, in some embodiments. For example, a score threshold may be compared with the anomaly score. If the anomaly score falls below the score threshold, then an anomaly may be detected. Various other types of thresholds or criteria for evaluating an anomaly score may be applied, and thus the previous example is not intended to be limiting.

As indicated at 640, a result that indicates a detected anomaly in the time series data may be provided, in some embodiments. For example, the result may be a response, notification, display, or other communication technique that indicates the anomaly. Various information about the anomaly (e.g., time occurred, confidence in result, etc.) may be provided in addition to the indication that the anomaly was detected, in some embodiments.

In some embodiments, anomaly detection may be performed in discrete fashion in response to requests to evaluate a specified set of time series data. In some embodiments, time series data may be monitored, as indicated by the dotted, loop-back arrows, and thus may be continually (or periodically performed when or as time series data is received (e.g., in streaming fashion)).

As noted above, different types of responsive actions may be supported by a service, like monitoring service 210 discussed above with regard to FIG. 2, which may train an autoencoder network model with masked connections, deploy the trained auto encoder network model for anomaly detection, and handle anomalies detected by the deployed model. FIG. 7 illustrates a high-level flowchart of various methods and techniques to implement handling responsive actions for anomalies detected using group masked autoencoder for anomaly detection, according to some embodiments. As indicated at 710, an autoencoder network model with masked connection(s) to enforce a dependency ordering between frames in a group of frames without supervision may be trained using received training audio data. For example, various unsupervised learning techniques, such as Adam optimization or stochastic gradient descent, among others, may be used to train the autoencoder network model. As noted earlier, mask values may be calculated or determined according to the selected ordering for a group (e.g., as may be specified according to mask matrices for different layers of the network). In at least some embodiments, the training data may have no anomalies present (or no identified anomalies).

As indicated at 720, the trained autoencoder network model may be deployed for anomaly detection, in various embodiments. For example, the trained autoencoder network model may be stored, hosted, moved, copied, or otherwise provided to device(s) in an anomaly detection system that will perform anomaly detection on received audio data (e.g., a stream of audio data captured by audio sensors and monitored for anomalies).

As indicated at 730, audio data may be received that is captured by audio sensor(s), in some embodiments. For example, an interface (e.g., an API hosted or implemented a network-endpoint) may allow sensors to directly (or via an intermediary collection and/or reporting system) submit audio data. The audio data from the audio sensor(s) may be combined into a single audio data stream, in some embodiments, and/or may be considered as separate streams of audio (for which separate audio monitoring is performed).

As indicated at 740, the deployed autoencoder network mode may be applied to the received audio data to estimate a joint probability distribution of normality for the group of frames of the received audio data in order to determine an anomaly score, in some embodiments. As discussed above with regard to FIG. 6, the auto-encoder model may provide a set or probabilities from which the negative log likelihood may be determined as the anomaly score, in some embodiments. As indicated at 750, a determination may be made as to whether an anomaly is detected according to the anomaly score, in some embodiments. For instance, the anomaly score may be specified (e.g., by a user via an interface) or may be a default, pre-defined value, in some embodiments. Monitoring may continue (as indicated by the negative exit from 750), even if no anomaly is detected.

As indicated at 760, if an anomaly is detected, then a responsive action specified for the detected anomaly may be caused to be performed, in some embodiments. For instance, various types of alarm, events, triggers, or other reporting mechanisms may be implemented. In some embodiments, review workflows, audit logs, and/or corrective actions may be taken. The specified responsive action may be determined via a mapping or other data structure that stores responsive actions (e.g., specified by a user via an interface) with the corresponding anomalies (e.g., according to type or source of anomaly), in some embodiments. The appropriate system calls, APIs, instructions, or other commands may be invoked in order to cause the specified responsive action, in some embodiments (e.g., according to a template, instruction, or other information recorded along with the specified responsive action in the mapping of responsive actions to anomalies).

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
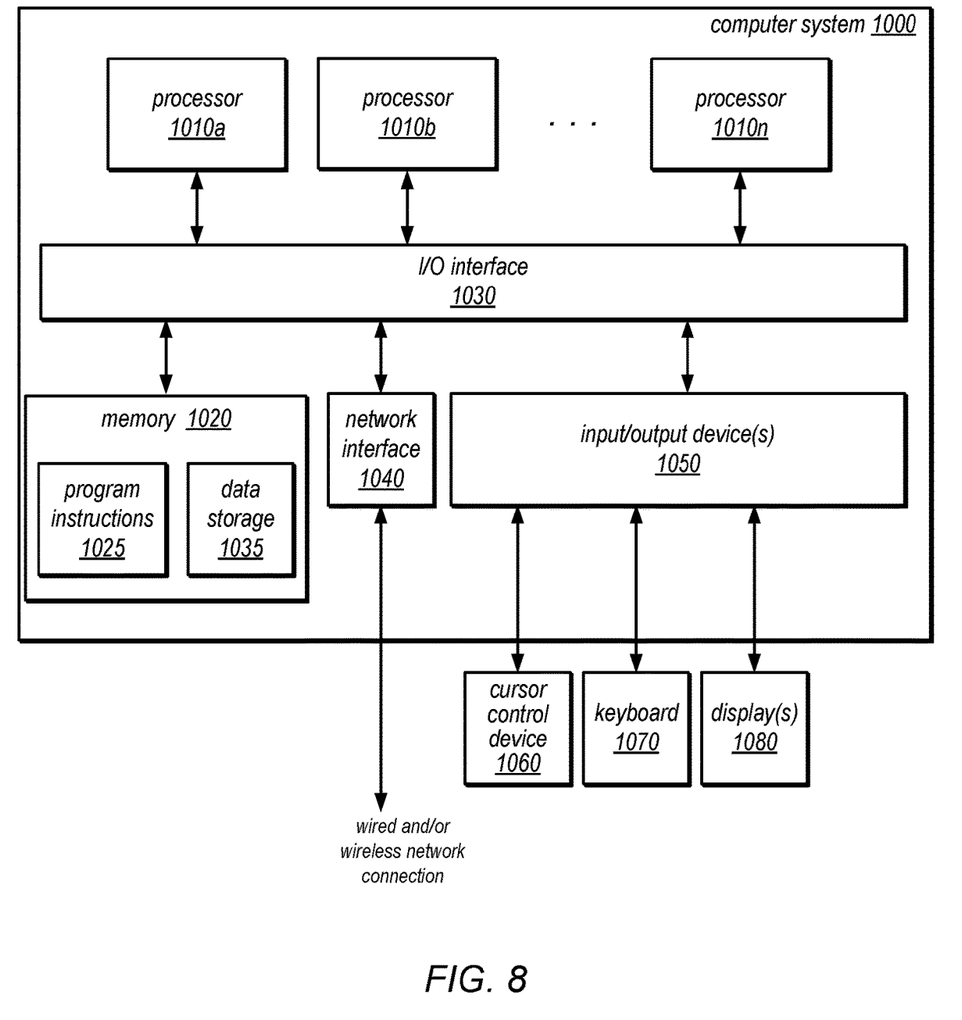
FIG. 8 illustrates an example system to implement the various methods, techniques, and systems described herein, according to some embodiments.

Embodiments of group masked autoencoder for anomaly detection as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, including the application of group masked autoencoder for anomaly detection, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor; and
a memory, storing program instructions that when executed by the at least one processor, cause the at least one processor to:
receive audio data via an interface for an anomaly detection system;
divide, by the anomaly detection system, the audio data into different frames;
apply, by the anomaly detection system, an autoencoder network model trained without supervision to output an estimated joint probability distribution of normality for a group of the different frames, wherein one or more connections in the autoencoder network model are masked to enforce a dependency ordering between individual ones of the group of frames to estimate the joint probability distribution of normality, and wherein the dependency ordering estimates the joint probability distribution for one frame of the group of frames according to one or more frames of the group of frames that occur after the one frame;
determine, by the anomaly detection system, an anomaly score based, at least in part, on the estimated joint probability distribution of normality for the group;
detect, by the anomaly detection system, an anomaly in the audio data according to the determined anomaly score; and
send, by the anomaly detection system, a result via the interface indicating the detected anomaly in the audio data.

2. The system of claim 1, wherein the dependency ordering is one of a plurality of different dependency orderings implemented by the anomaly detection system and wherein the dependency ordering is specified in a request received at the anomaly detection system via the interface.

3. The system of claim 1, wherein to detect the anomaly in the audio data, the program instructions cause the at least one processor to compare the anomaly score with a score threshold specified for detecting anomalies via the interface.

4. The system of claim 1, wherein the anomaly detection system is implemented as part of a monitoring service offered by a provider network, wherein the audio data is received from one or more audio sensors that capture and send the audio data to the monitoring service, and wherein the result is sent via the interface according to a responsive action for anomalies specified in a request to the monitoring service.

5. A method, comprising:
receiving, at an anomaly detection system, time series data;
applying, by the anomaly detection system, an autoencoder network model trained without supervision to estimate a joint probability distribution of normality for a group of frames of the time series data used to determine an anomaly score, wherein one or more connections in the autoencoder network model are masked to enforce a dependency ordering between individual ones of the group of frames to estimate the joint probability distribution of normality, and wherein the dependency ordering estimates the joint probability distribution for one frame of the group of frames according to one or more frames of the group of frames that occur after the one frame; and
providing, by the anomaly detection system, a result that indicates an anomaly detected in the time series data according to the determined anomaly score.

6. The method of claim 5, further comprising comparing the determined anomaly score with a score threshold specified via an interface for the anomaly detection system to detect the anomaly in the time series data.

7. The method of claim 5, wherein the the one frame is a middle one of the group of frames according to another one or more frames of the group that occur before the middle frame.

8. The method of claim 5, further comprising:
applying, by the anomaly detection system, a second autoencoder network model trained without supervision to estimate a second joint probability distribution of normality for the group of frames of the time series data used to determine a second anomaly score, wherein one or more connections in the second autoencoder network model are masked to enforce a second dependency ordering between individual ones of the group of frames to estimate the joint probability distribution of normality; and
detecting, by the anomaly detection system, the anomaly in the time series data according to a weighted combination of the anomaly score and the second anomaly score.

9. The method of claim 5, wherein the dependency ordering estimates the joint probability distribution for the one frame of the group of frames according to another one or more frames of the group of frames that occur before the one frame.

10. The method of claim 5, further comprising:
selecting the dependency ordering out of a plurality of dependency orderings implemented by the anomaly detection system according to respective results of different respective trials performed using individual ones of the plurality of dependency orderings using a validation data set.

11. The method of claim 5, wherein the dependency ordering is one of a plurality of different dependency orderings implemented by the anomaly detection system and wherein the dependency ordering is specified in a request received at the anomaly detection system via an interface for the anomaly detection system.

12. The method of claim 5, wherein the time series data is audio data.

13. One or more non-transitory, computer-readable storage media, storing program instructions that when executed on or across one or more computing devices cause the one or more computing devices to implement:
receiving, at an anomaly detection system, time series data;
applying, by the anomaly detection system, an autoencoder network model trained without supervision to estimate a joint probability distribution of normality for a group of frames of the time series data used to determine an anomaly score, wherein one or more connections in the autoencoder network model are masked to enforce a dependency ordering between individual ones of the group of frames to estimate the joint probability distribution of normality, and wherein the dependency ordering estimates the joint probability distribution for one frame of the group of frames according to one or more frames of the group of frames that occur after the one frame;

detecting, by the anomaly detection system, an anomaly in the time series data according to the determined anomaly score; and providing, by the anomaly detection system, a result indicating the detected anomaly in the time series data.

14. The one or more non-transitory, computer-readable storage media of claim 13, wherein the dependency ordering is one of a plurality of different dependency orderings implemented by the anomaly detection system and wherein the dependency ordering is specified in a request received at the anomaly detection system via an interface for the anomaly detection system.

15. The one or more non-transitory, computer-readable storage media of claim 13, wherein the one frame is a middle one of the group of frames according to another one or more frames of the group that occur before the middle frame.

16. The one or more non-transitory, computer-readable storage media of claim 13, storing further program instructions that when executed on or across the one or more computing devices cause the one or more computing devices to further implement:

applying, by the anomaly detection system, a second autoencoder network model trained without supervision to estimate a second joint probability distribution of normality for the group of frames of the time series data used to determine a second anomaly score, wherein one or more connections in the second autoencoder network model are masked to enforce a second dependency ordering between individual ones of the group of frames to estimate the joint probability distribution of normality; and detecting, by the anomaly detection system, the anomaly in the time series data according to a weighted combination of the anomaly score and the second anomaly score.

17. The one or more non-transitory, computer-readable storage media of claim 13, wherein the dependency ordering estimates the joint probability distribution for the one frame of the group of frames according to another one or more frames of the group of frames that occur before the one frame.

18. The one or more non-transitory, computer-readable storage media of claim 13, wherein, in detecting the anomaly in the time series data according to the determined anomaly score, the program instructions cause the one or more computing devices to implement comparing the determined anomaly score with a score threshold specified for detecting anomalies via an interface for the anomaly detection system.

19. The one or more non-transitory, computer-readable storage media of claim 13, wherein the anomaly detection system is implemented as part of a monitoring service offered by a provider network, wherein the time series data is received from one or more sensors that capture and send the time series data to the monitoring service, and wherein the result is sent via the interface according to a responsive action for anomalies specified in a request to the monitoring service.

* * * * *